(12) United States Patent
Chen et al.

(10) Patent No.: US 9,389,448 B2
(45) Date of Patent: Jul. 12, 2016

(54) DEVICE FOR FIXING QUANTUM STRIP OF DISPLAY

(71) Applicant: SHENZHEN CHINA STAR OPTOELECTRONICS TECHNOLOGY CO., LTD., Shenzehn, Guangdong (CN)

(72) Inventors: Weifeng Chen, Shenzhen (CN); Guofu Tang, Shenzhen (CN); Yajun Yu, Shenzhen (CN); Jiaxin Li, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/380,917

(22) PCT Filed: Feb. 20, 2014

(86) PCT No.: PCT/CN2014/072292
§ 371 (c)(1),
(2) Date: Aug. 25, 2014

(87) PCT Pub. No.: WO2015/109625
PCT Pub. Date: Jul. 30, 2015

(65) Prior Publication Data
US 2015/0362786 A1 Dec. 17, 2015

(51) Int. Cl.
*G02F 1/1333* (2006.01)
*G02F 1/1335* (2006.01)
*G02F 1/017* (2006.01)

(52) U.S. Cl.
CPC .......... *G02F 1/133308* (2013.01); *G02F 1/017* (2013.01); *G02F 1/133608* (2013.01); *G02F 1/133615* (2013.01); *G02F 2001/01791* (2013.01)

(58) Field of Classification Search
CPC ............... G02F 1/33308; G02F 1/017; G02F 2001/01791; F21V 21/0832; F21V 21/008; F21V 19/003; F21V 19/004

USPC ................... 248/227.1, 316.7, 917
See application file for complete search history.

(56) References Cited

U.S. PATENT DOCUMENTS

| 6,183,107 B1 * | 2/2001 | Donato | F21S 4/003 362/220 |
| 6,964,496 B2 * | 11/2005 | Yang | F21V 19/009 362/220 |

(Continued)

FOREIGN PATENT DOCUMENTS

| CN | 201266283 Y | 7/2009 |
| CN | 202274448 U | 6/2012 |

(Continued)

OTHER PUBLICATIONS

International Search Report for PCT/CN2014/072292 dated Oct. 27, 2014.

(Continued)

*Primary Examiner* — Joshua J Michener
*Assistant Examiner* — Alp Akbasli
(74) *Attorney, Agent, or Firm* — Stein IP, LLC

(57) ABSTRACT

The present disclosure relates to the technical field of liquid crystal display, and particularly, relates to a device for fixing a quantum strip of a display. The device includes: a first support extending along a first direction, which first support is capable of clamping the long ineffective part of the quantum strip and being fixedly connected to the shell of the display, and which first support is provided with a connecting portion on one end in the first direction; a second support extending along the first direction, which second support is capable of clamping the effective part of the quantum strip and being fixedly connected to the shell of the display, and which second support is provided with connecting portions on both ends in the first direction, wherein the first support is connected to the second support on at least one end of the second support. The device according to the present disclosure can be flexibly spliced based on different numbers of the quantum strips, and a plurality of backlight incidences, including single-long incidence, double-long incidence, single-short incidence and double-short incidence and the like, can be achieved simultaneously.

19 Claims, 3 Drawing Sheets

(56) References Cited

U.S. PATENT DOCUMENTS

| | | | | |
|---|---|---|---|---|
| 7,165,862 B2* | 1/2007 | Wu | ............ | G02F 1/133604 362/218 |
| 7,452,102 B2* | 11/2008 | Ryu | ............ | F21V 19/008 349/58 |
| 2005/0226002 A1* | 10/2005 | Aoki | ............ | G02F 1/133604 362/581 |
| 2007/0286629 A1* | 12/2007 | Kwon | ............ | G02F 1/133604 399/69 |
| 2008/0018826 A1* | 1/2008 | Bae | ............ | G02F 1/133308 349/58 |
| 2009/0180049 A1* | 7/2009 | Lee | ............ | G09F 9/35 349/58 |
| 2010/0277666 A1* | 11/2010 | Bertram | ............ | F21K 9/00 349/61 |
| 2011/0199005 A1* | 8/2011 | Bretschneider | ............ | F21V 7/22 315/152 |
| 2012/0182713 A1* | 7/2012 | Bretschneider | ............ | F21V 29/004 362/84 |
| 2013/0308074 A1* | 11/2013 | Park | ............ | G02B 6/0088 349/58 |
| 2014/0112021 A1* | 4/2014 | Wang | ............ | G02B 6/0088 362/633 |
| 2014/0211454 A1* | 7/2014 | Dunn | ............ | G02F 1/133308 362/97.3 |
| 2014/0240644 A1* | 8/2014 | Abe | ............ | G02B 6/0088 349/71 |
| 2014/0333866 A1* | 11/2014 | Tang | ............ | G02F 1/133308 349/58 |
| 2014/0333869 A1* | 11/2014 | Tang | ............ | G02F 1/133308 349/60 |
| 2015/0055316 A1* | 2/2015 | Ye | ............ | G02B 7/00 361/809 |
| 2015/0192729 A1* | 7/2015 | Hosoki | ............ | G02F 1/133308 348/794 |
| 2015/0248035 A1* | 9/2015 | Kubo | ............ | H04N 5/44 348/725 |

FOREIGN PATENT DOCUMENTS

| | | | | |
|---|---|---|---|---|
| CN | 202349894 U | 7/2012 | | |
| CN | 202521397 U | 11/2012 | | |
| CN | 102954408 A | 3/2013 | | |
| CN | 202791483 U | 3/2013 | | |
| EP | 2674808 A1 * | 12/2013 | ........ | G02F 1/133615 |
| JP | 1995281221 A | 10/1995 | | |
| KR | 1020110012246 A | 2/2011 | | |
| KR | 101086694 B1 | 3/2011 | | |
| WO | WO2013122410 A1 | 8/2013 | | |

OTHER PUBLICATIONS

Chinese Office Action with search report issued by the Chinese Patent Office, dated Dec. 30, 2015 in corresponding application 201410041165.3.

* cited by examiner

DEVICE FOR FIXING QUANTUM STRIP OF DISPLAY

FIELD OF THE INVENTION

The present disclosure relates to the technical field of liquid crystal display, and particularly, relates to a device for fixing a quantum strip of a display.

BACKGROUND OF THE INVENTION

Liquid crystal displays (LCD) dominate the markets of televisions and mobile electronic products. Over the years, manufacturers have focused on continuously reducing the cost of large-scale manufacture of the liquid crystal displays (LCD), which makes them a ubiquitous commodity.

Usually, richer colors of the liquid crystal display (LCD) can be achieved through technology, though being extremely costly. For example, there has emerged a display technology based on organic light-emitting diodes (OLED), with which richer colors and, in some cases, lower energy consumption can be achieved, although it would cost a much higher price.

The same effect can also be achieved by simply adding a layer of nanometer materials. For example, the display effect can be improved with a quantum strip embedded with spherical quantum dots of nanometer size. The color gamut of a liquid crystal display (LCD) with the quantum strip can be comparable to that of an organic light emitting diode (OLED), and this can be achieved without any modification in the manufacturing process and thus without much increase in the cost.

Nowadays, the liquid crystal displays (LCD) used in mobile electronic devices all adopt a group of light emitting diodes on the back of the device as white light sources. The light passing through is controlled with the liquid crystal, and different colors are presented with a color filter. However, since white light sources are very expensive, blue light-emitting diodes are generally used in displays, which are covered with fluorescent powder to emit white light.

The fluorescent powder can be replaced with the previous mentioned quantum strip. A part of the blue light emitted by the diodes can be converted into red light and green light through the quantum dots in the quantum strip. Compared with the white light emitted by the backlight in a conventional liquid crystal display (LCD), larger amount of red light, green light and blue light would pass through the color filter, resulting in a brighter display and a richer color.

FIG. 1 shows a longitudinal cross section diagram of a common quantum strip in the prior art, and FIG. 2 shows a transversal cross section diagram of a common quantum strip in the prior art. With reference to FIG. 2, a quantum strip 10 generally includes a functional portion 15 located interior to implement its functionality and a package portion 14 enclosing the functional portion 15, wherein the functional portion 15 is generally made from a material formed with quantum dots and the package portion 14 is generally made of glass.

Therefore, with reference to FIG. 1, it can be seen that the quantum strip 10 is divided, along its longitudinal direction, into an effective region 11 located in the middle part to implement its functionality and a long ineffective regions 12 and a short ineffective regions 13 located on both sides respectively.

Considering the practical situation in the prior art, since the longitudinal length of the short ineffective region 13 is relatively short, no substantive influence would be generated on the display effect of the display. However, the longitudinal length of the long ineffective region 12 is relatively large, and the quality of the light emitted by the entire backlight can be affected by the long ineffective region 12 if the quantum strip 10 is not positioned properly, which will result in an unqualified display effect of the entire display accordingly.

On the other hand, due to constraints of technical conditions and cost, the longitudinal length of the quantum strip 10 is also limited. If the quantum strip is too long, it will cause high cost and increase assembly difficulty, thus increasing the production cost and failure risk. If the longitudinal length of the quantum strip 10 is designed to be relatively short, how to connect and fix the quantum strips should be taken into consideration correspondingly.

SUMMARY OF THE INVENTION

Considering the practical situation in the prior art, the longitudinal length of the long ineffective region of the quantum strip is relatively large, and the quality of the light emitted by the entire backlight can be affected by the long ineffective region if the quantum strip is not positioned properly, which will result in an unqualified display effect of the entire display accordingly. On the other hand, due to constraints of technical conditions and cost, the longitudinal length of the quantum strip is also limited, and how to connect and fix the quantum strips should be taken into consideration correspondingly.

Accordingly, the present disclosure provides a device for fixing a quantum strip of a display, the quantum strip being divided, along its longitudinal direction, into an effective region located in the middle part to implement its functionality and a long ineffective region and a short ineffective region located on both sides respectively, the device including: a first support extending along a first direction, which is capable of clamping the long ineffective part of the quantum strip and being fixedly connected to the shell of the display, and is provided with a connecting portion on one end in the first direction; a second support extending along the first direction, which is capable of clamping the effective part of the quantum strip and being fixedly connected to the shell of the display, and is provided with connecting portions on both ends in the first direction, wherein the first support is connected to the second support on at least one end of the second support, and the long ineffective region of the quantum strip is fixed by the first support through an elastic clamping element, and the effective region of the quantum strip is fixed by the second support through an elastic clamping element, with the elastic clamping element being provided with an pressing surface capable of tightly engaging with the outer surface of the quantum strip. The second support can be made from a proper material, to perform physical protection and thermal insulation protection on the quantum strip. Meanwhile, the quantum strip can be fixed to a certain position on the display with the device, which prevents the displacement of the quantum strip.

Preferably, the first support is provided with a first side wall and a first bottom wall, both of which extend along the first direction with a right angle or an acute angle formed between them, and a hook connecting member is arranged on the first side wall, and a thread connecting member is arranged on the first bottom wall.

The hook connecting member is used for, for example, fixing the device onto a light bar or a plate of the display integrated with light emitting diodes, which helps to effectively fix the quantum strip nearby the light emitting diodes, thus implementing the function of the entire backlight. Meanwhile, a certain light coupling distance can be kept between the light emitting diodes and the quantum strip, for improving the utilization rate of the light and making the light emitted by the backlight more uniform. The thread connecting member may include a threaded hole and a screw penetrating through the threaded hole, for instance, and the first support can be fixed to the shell of the display through the screw. Consequently, the first support, together with the quantum strip, can be fastened onto the shell of the display.

Preferably, the second support is provided with a second side wall and a second bottom wall, both of which extend along the first direction with a right angle or an acute angle formed between them, while a hook connecting member is arranged on the second side wall, and a thread connecting member is arranged on the second bottom wall.

The hook connecting member is used for, for example, fixing the device onto a light bar or a plate of the display integrated with light emitting diodes, which helps to effectively fix the quantum strip nearby the light emitting diodes, thus implementing the function of the entire backlight. Meanwhile, a certain light coupling distance can be kept between the light emitting diodes and the quantum strip, for improving the utilization rate of the light and making the light emitted by the backlight more uniform. The thread connecting member may include a threaded hole and a screw penetrating through the threaded hole, for instance, and the second support can be fixed to the shell of the display through the screw. Consequently, the second support, together with the quantum strip, can be fastened onto the shell of the display.

Preferably, the long ineffective part of the quantum strip is fixed by the first support through an elastic clamping element, and/or the effective part of the quantum strip is fixed by the second support through an elastic clamping element, with the elastic clamping element being provided with an pressing surface capable of tightly engaging with the outer surface of the quantum strip. The first support and the second support can be made from a proper material, to perform physical protection and thermal insulation protection on the quantum strip. The quantum strip is fixed onto a certain position on the display by the connecting member, and is prevented from displacement with firm clamping by the pressing surface.

Preferably, the device includes a plurality of second supports connected with each other one by one, and a first support connected with a corresponding one of the plurality of second supports on one end of said one of the plurality of second supports.

The above-mentioned situation is suitable for the condition that one quantum strip is arranged on one edge of the display. After one quantum strip is fixed onto the device of this implementation scheme through the elastic clamping element, the long ineffective part of the quantum strip is located on one end, corresponding to the first support and fixed by the same, while the short ineffective part of the quantum strip is located on the other end, with the short ineffective part and the effective part corresponding to the plurality of second supports and fixed by them.

In the embodiment, the device according to the present disclosure is arranged on one short edge of the display, or on two opposite short edges, to respectively achieve backlight incidences of single-short incidence and double-short incidence.

Preferably, the device includes a plurality of second supports connected with each other one by one, and two first supports respectively connected with the plurality of second supports on two ends of the plurality of second supports.

The above-mentioned condition is suitable for the situation that two quantum strips are arranged on one edge of the display. The two quantum strips can be arranged along one single straight line but pointing oppositely, so that the short ineffective parts thereof abut against each other but the long ineffective parts point towards opposite directions respectively. After the two quantum strips are fixed on the device through the elastic clamping element, the long ineffective parts of the two quantum strips are located on both ends respectively, corresponding to and fixed by the two first supports. The short ineffective parts of the two quantum strips are located centrally, and the short ineffective parts and the effective parts are corresponding to the plurality of second supports and fixed by them.

In the embodiment, the device according to the present disclosure is arranged on one long edge of the display, or on two opposite long edges, to respectively achieve backlight incidences of single-long incidence and double-long incidence.

Preferably, the first support includes one hook connecting member, two thread connecting members and one elastic clamping element. With the above-mentioned number of the members, the fixing effect of the device according to the present disclosure can be ensured while saving the materials and simplifying the manufacturing procedures to the maximum degree.

Preferably, the second support includes three hook connecting members, three thread connecting members and two elastic clamping elements. With the above-mentioned number of the members, the fixing effect of the device according to the present disclosure can be ensured while saving the materials and simplifying the manufacturing procedures to the maximum degree.

Preferably, the connecting portion is an edge of curvature with a shape complementary to that of the object to be connected. However, the present disclosure is not limited hereto, and the connecting portion can also have other forms. The manufacturing process of the edge of curvature is relatively simple and the cost is low.

Preferably, the device includes seven second supports connected with each other one by one and two first supports respectively connected to both ends thereof, or the device includes five second supports connected with each other one by one and one first support connected to one end thereof. With the above-mentioned number of the supports, the fixing effect of the device according to the present disclosure can be ensured while saving the materials and simplifying the manufacturing procedures to the maximum degree.

The device for fixing the quantum strip of the display according to the present disclosure can be flexibly spliced together based on different numbers of the quantum strips, and a plurality of backlight incidences, including single-long incidence, double-long incidence, single-short incidence and double-short incidence and the like, can be achieved simultaneously.

The above-mentioned technical features may be combined together in feasible manners to generate new implementation solutions, as long as the objectives of the present disclosure can be fulfilled.

BRIEF DESCRIPTION OF THE DRAWINGS

The present disclosure will be described in more detail below based on merely nonfinite examples with reference to the accompanying drawings, in which.

In the accompanying drawings, the same components are indicated by the same reference signs. The accompanying drawings are not drawn to actual scale.

DETAILED DESCRIPTION OF THE EMBODIMENTS

The present disclosure will be introduced in detail below with reference to the accompanying drawings.

The present disclosure provides a device for fixing a quantum strip of a display. The device includes a first support 20 extending along a first direction and a second support 30 extending along the first direction as well, wherein the first support 20 is connected to the second support 30 on at least one end of the second support 30.

Figure 1:
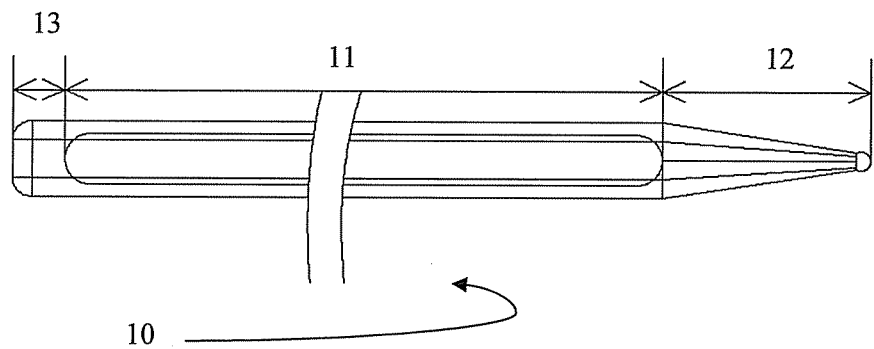
FIG. 1 shows a longitudinal cross section diagram of a common quantum strip in the prior art.
Figure 2:
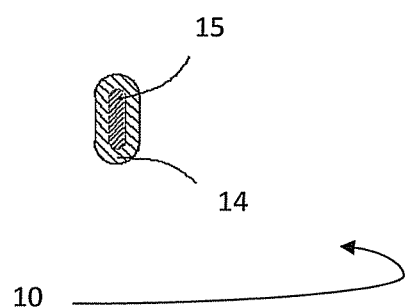
FIG. 2 shows a transversal cross section diagram of a common quantum strip in the prior art.
Figure 3:
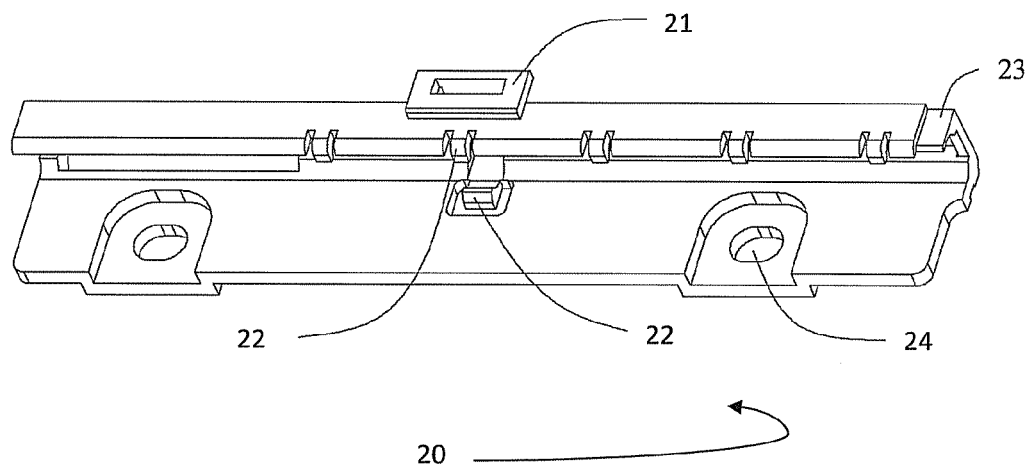
FIG. 3 shows a first support of a device for fixing a quantum strip of a display according to the present disclosure.
Figure 4:
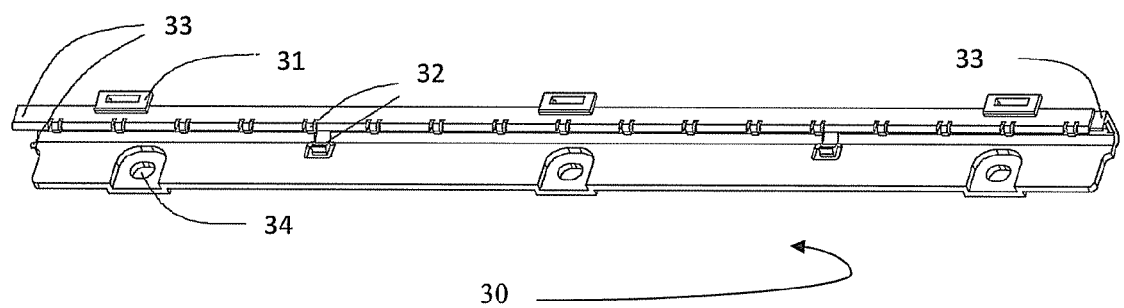
FIG. 4 shows a second support of a device for fixing a quantum strip of a display according to the present disclosure.

FIG. 3 shows a first support 20 of a device for fixing a quantum strip of a display according to the present disclosure, and FIG. 4 shows a second support 30 of a device for fixing a quantum strip of a display according to the present disclosure.

With reference to FIG. 3, the first support 20 can clamp a long ineffective part 12 of a quantum strip 10, and is fixedly connected to the shell of the display. The first support 20 is provided with a connecting portion 23 on one end in the first direction, for connection with the end of the second support 30, so as to form the device for fixing the quantum strip of the display according to the present disclosure.

With reference to FIG. 4, the second support 30 can clamp an effective part 11 of the quantum strip 10, and is fixedly connected to the shell of the display. The second support 30 is provided with connecting portions 33 on both ends in the first direction, for connection with the end of the first support 20 or with the end of another second support 30, so as to form the device for fixing the quantum strip of the display according to the present disclosure.

Specifically, with reference to FIG. 3, the first support 20 is provided with a first side wall and a first bottom wall both extending along the first direction with a right angle or an acute angle formed between them. A hook connecting member 21 is arranged on the first side wall, and a thread connecting member 24 is arranged on the first bottom wall. In FIG. 3, the first support 20 includes one hook connecting member 21, two thread connecting members 24, and one elastic clamping element 22.

For example, the hook connecting member 21 is used for fixing the device on a light bar or a plate of the display integrated with light emitting diodes, so as to effectively fix the quantum strip 10 nearby the light emitting diodes, thus implementing the function of the entire backlight. Meanwhile, a certain light coupling distance can be kept between the light emitting diodes and the quantum strip 10, so as to improve the utilization rate of light and make the light emitted by the backlight source more uniform.

For example, the thread connecting member 24 may include a threaded hole and a screw penetrating through the threaded hole, and the first support 20 can be fixed to the shell of the display through the screw. As a result, the first support 20 and the quantum strip 10 can be fastened to the shell of the display together.

The long ineffective part 12 of the quantum strip 10 can be fixed by the first support 20 through the elastic clamping element 22, which is provided with a pressing surface capable of tightly engaging with the outer surface of the quantum strip 10.

With reference to FIG. 4, the second support 30 is provided with a second side wall and a second bottom wall both extending along the first direction with a right angle or an acute angle formed between them. A hook connecting member 31 is arranged on the second side wall, and a thread connecting member 34 is arranged on the second bottom wall. In FIG. 4, the second support 30 includes three hook connecting members 31, three thread connecting members 34, and two elastic clamping elements 22. Among others, the three hook connecting members 31 are spaced from each other with the same distance, and the three thread connecting members 34 are also spaced from each other with the same distance, thus ensuring a uniform fixing effect of the quantum strip 10 in the longitudinal direction, i.e., the first direction.

For example, the hook connecting member 31 is used for fixing the device on a light bar or a plate of the display integrated with light emitting diodes, to effectively fix the quantum strip 10 nearby the light emitting diodes, thus implementing the function of the entire backlight. Meanwhile, a certain light coupling distance can be kept between the light emitting diodes and the quantum strip 10, to improve the utilization rate of light and make the light emitted by the backlight source more uniform.

For example, the thread connecting member 34 may include a threaded hole and a screw penetrating through the threaded hole, and the second support 30 can be fixed to the shell of the display through the screw. In this way, the second support 30, together with the quantum strip 10, can be fastened to the shell of the display.

The effective part 11 and the short ineffective part 13 of the quantum strip 10 can be fixed by the second support 30 through the elastic clamping element 32, which is provided with a pressing surface capable of tightly engaging with the outer surface of the quantum strip 10.

Figure 5:
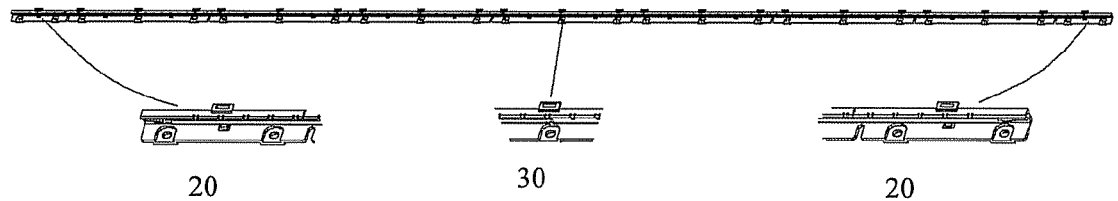
FIG. 5 shows a first embodiment of a device for fixing a quantum strip of a display according to the present disclosure.

FIG. 5 shows a first embodiment of a device for fixing a quantum strip of a display according to the present disclosure. In FIG. 5, the device according to the present disclosure includes a plurality of second supports 30 connected with each other one by one, and two first supports 20 connected with the plurality of second supports 30 on both ends respectively. In the embodiment shown in FIG. 5, the device includes seven second supports 30 connected with each other one by one, and two first supports 20 connected to both ends thereof respectively.

The condition of FIG. 5 is suitable for the situation that two quantum strips 10 are arranged on one edge of the display. The two quantum strips 10 can be oppositely arranged along one single straight line, so that the short ineffective parts 13 thereof abut against each other but the long ineffective parts 12 point toward opposite directions respectively. After the two quantum strips 10 are fixed on the device as shown in FIG. 5 through the elastic clamping elements 22 and 32, the long ineffective parts 12 of the two quantum strips 10 are located on both ends respectively, corresponding to and fixed by the two first supports 20. Meanwhile, the short ineffective parts 13 of the two quantum strips are located centrally, and the short ineffective parts 13 and the effective parts 11 are corresponding to and fixed by the plurality of second supports 30.

In the first embodiment, the device according to the present disclosure is arranged on one long edge of the display, or on two opposite long edges, to respectively achieve backlight incidences of single-long incidence and double-long incidence.

Figure 6:
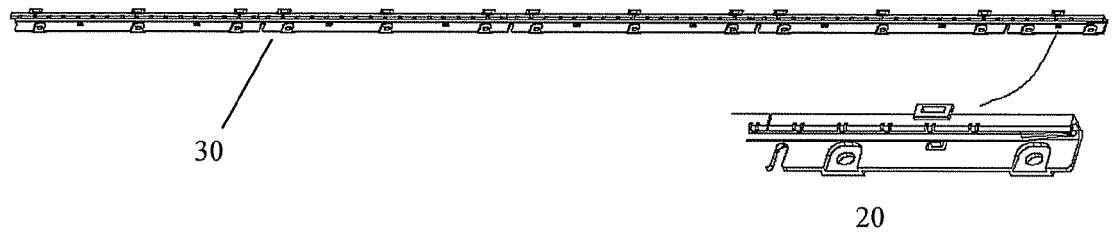
FIG. 6 shows a second embodiment of a device for fixing a quantum strip of a display according to the present disclosure.

FIG. 6 shows a second embodiment of a device for fixing a quantum strip of a display according to the present disclosure. In the second embodiment, the device according to the present disclosure includes a plurality of second supports 30 connected with each other one by one, and a first support 20 connected with a corresponding one of the plurality of second supports 30 on one end of said one. For example, the device may include five second supports 30 connected with each other one by one, and one first support 20 connected to one end thereof.

The condition of FIG. 6 is suitable for the situation that one quantum strip 10 is arranged on one edge of the display. After one quantum strip 10 is fixed on the device as shown in FIG. 6 through the elastic clamping elements 22 and 32, the long ineffective part 12 of the quantum strip 10 is located on one end, i.e. the right end in the figure, corresponding to and fixed by the first support 20. The short ineffective part 13 of the quantum strip is located on the other end, i.e. the left end in the figure, while the short ineffective part 13 and the effective part 11 are corresponding to and fixed by the plurality of second supports 30.

In the second embodiment, the device according to the present disclosure is arranged on one short edge of the display, or on two opposite short edges, to respectively achieve backlight incidences of single-short incidence and double-short incidence.

Figure 7:
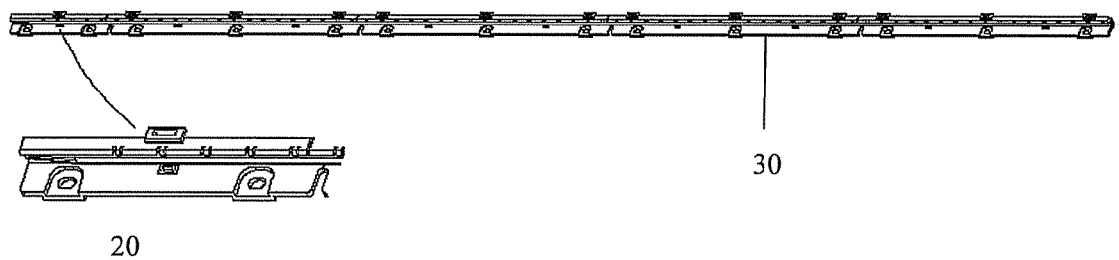
FIG. 7 shows a third embodiment of a device for fixing a quantum strip of a display according to the present disclosure.

FIG. 7 shows a third embodiment of a device for fixing a quantum strip of a display according to the present disclosure. In the third embodiment, the device according to the present disclosure includes a plurality of second supports 30 connected with each other on by one, and a first support 20 connected with a corresponding one of the plurality of second supports 30 on one end of said one. For example, the device may include five second supports 30 connected with each other one by one and one first support 20 connected to one end thereof.

The condition of FIG. 7 is suitable for the situation that one quantum strip 10 is arranged on one edge of the display. After one quantum strip 10 is fixed on the device as shown in FIG. 7 through the elastic clamping elements 22 and 32, the long ineffective part 12 of the quantum strip 10 is located on one end, i.e. the left end in the figure, corresponding to and fixed by the first support 20. The short ineffective part 13 of the quantum strip is located on the other end, i.e. the right end in the figure, and the short ineffective part 13 and the effective part 11 are corresponding to and fixed by the plurality of second supports 30.

In the third embodiment, the device according to the present disclosure is arranged on one short edge of the display, or on two opposite short edges, to respectively achieve backlight incidences of single-short incidence and double-short incidence.

In addition, in examples shown in the accompanying drawings, the connecting portions 23, 33 are edges of curvature with a shape complementary to that of the object to be connected. However, the present disclosure is not limited hereto, and the connecting portions can also have other forms.

Although the present disclosure has been described with reference to the preferred embodiments, various modifications could be made to the present disclosure without departing from the scope of the present disclosure and components in the present disclosure could be substituted by equivalents. The present disclosure is not limited to the specific embodiments disclosed in the description, but includes all technical solutions falling into the scope of the claims.

The invention claimed is:

1. A device for fixing a quantum strip of a display, the quantum strip being divided, along its longitudinal direction, into an effective region located in the middle part to implement its functionality and a long ineffective region and a short ineffective region located on both sides respectively wherein the long ineffective region is longer than the short ineffective region, the device including:
a first support extending along a first direction, which first support is capable of clamping a long ineffective part of the quantum strip and being fixedly connected to a shell of the display, and is provided with a connecting portion on one end in the first direction;
a second support extending along the first direction, which second support is capable of clamping an effective part of the quantum strip and being fixedly connected to the shell of the display, and is provided with connecting portions on both ends in the first direction,
wherein the first support is connected to the second support on at least one end of the second support,
and the long ineffective region of the quantum strip is fixed by the first support through an elastic clamping element, and the effective region of the quantum strip is fixed by the second support through an elastic clamping element, with the elastic clamping element being provided with an pressing surface capable of engaging with an outer surface of the quantum strip.

2. The device according to claim 1, wherein the first support is provided with a first side wall and a first bottom wall, both of which extend along the first direction with a right angle or an acute angle formed between them, and
a hook connecting member is arranged on the first side wall, and a thread connecting member is arranged on the first bottom wall.

3. The device according to claim 2, wherein the device includes seven second supports connected with each other one by one and two first supports respectively connected to both ends thereof, or the device includes five second supports connected with each other one by one and one first support connected to one end thereof.

4. The device according to claim 2, wherein the second support is provided with a second side wall and a second bottom wall, both of which extend along the first direction with a right angle or an acute angle formed between them, while a hook connecting member is arranged on the second side wall, and a thread connecting member is arranged on the second bottom wall.

5. The device according to claim 4, wherein the device includes seven second supports connected with each other one by one and two first supports respectively connected to both ends thereof, or the device includes five second supports connected with each other one by one and one first support connected to one end thereof.

6. The device according to claim 4, wherein the device includes a plurality of second supports connected with each other one by one, and a first support connected with a corresponding one of the plurality of second supports on one end of said one of the plurality of second supports.

7. The device according to claim 6, wherein the first support includes one hook connecting member, two thread connecting members, and one elastic clamping element.

8. The device according to claim 6, wherein the second support includes three hook connecting members, three thread connecting members and two elastic clamping elements.

9. The device according to claim 6, wherein the connecting portion is a edge of curvature with a shape complementary to that of the object to be connected.

10. The device according to claim 6, wherein the device includes seven second supports connected with each other one by one and two first supports respectively connected to both ends thereof, or the device includes five second supports connected with each other one by one and one first support connected to one end thereof.

11. The device according to claim 4, wherein the device includes a plurality of second supports connected with each other one by one, and two first supports respectively connected with the plurality of second supports on two ends of the plurality of second supports.

12. The device according to claim 11, wherein the first support includes one hook connecting member, two thread connecting members and one elastic clamping element.

13. The device according to claim 11, wherein the second support includes three hook connecting members, three thread connecting members and two elastic clamping elements.

14. The device according to claim 11, wherein the connecting portion is an edge of curvature with a shape complementary to that of the object to be connected.

15. The device according to claim 11, wherein the device includes seven second supports connected with each other one by one and two first supports respectively connected to both ends thereof, or the device includes five second supports connected with each other one by one and one first support connected to one end thereof.

16. The device according to claim 1, wherein the first support includes one hook connecting member, two thread connecting members and one elastic clamping element.

17. The device according to claim 1, wherein the second support includes three hook connecting members, three thread connecting members and two elastic clamping elements.

18. The device according to claim 1, wherein the connecting portion is an edge of a curvature with a shape complementary to that of the object to be connected.

19. The device according to claim 1, wherein the device includes seven second supports connected with each other one by one and two first supports respectively connected to both ends thereof, or the device includes five second supports connected with each other one by one and one first support connected to one end thereof.

* * * * *